Oct. 28, 1952     E. T. YOUNG     2,615,335
PIPE LINE METERING DEVICE WITH BEARING PROTECTION MECHANISM
Filed July 15, 1948     4 Sheets-Sheet 1
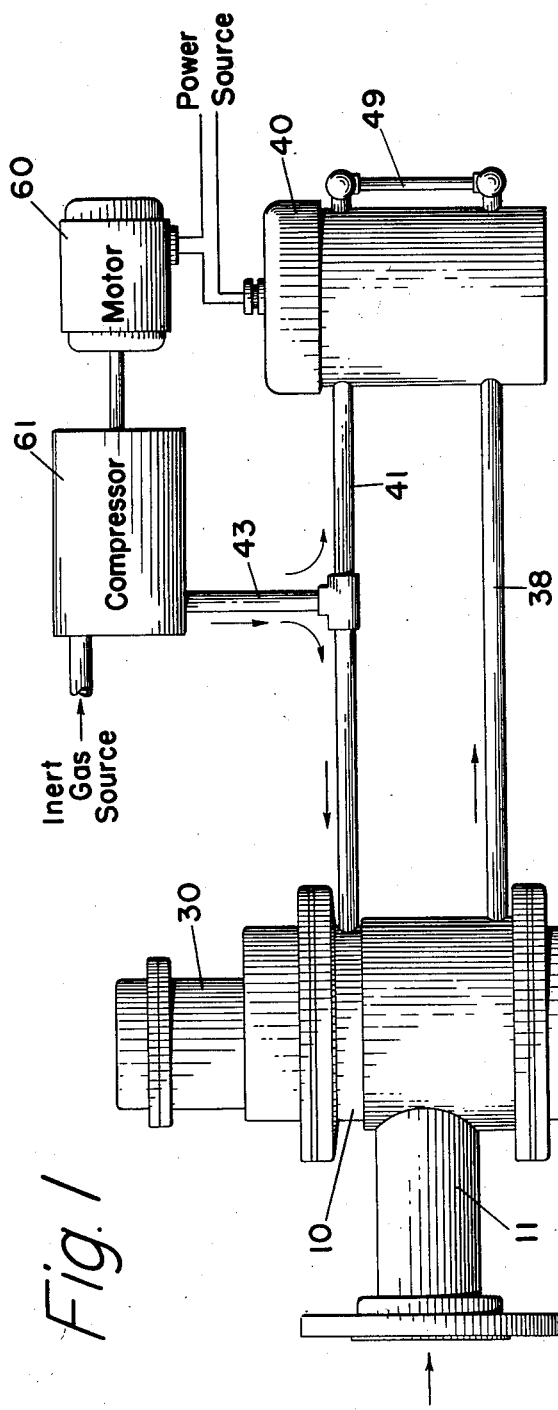
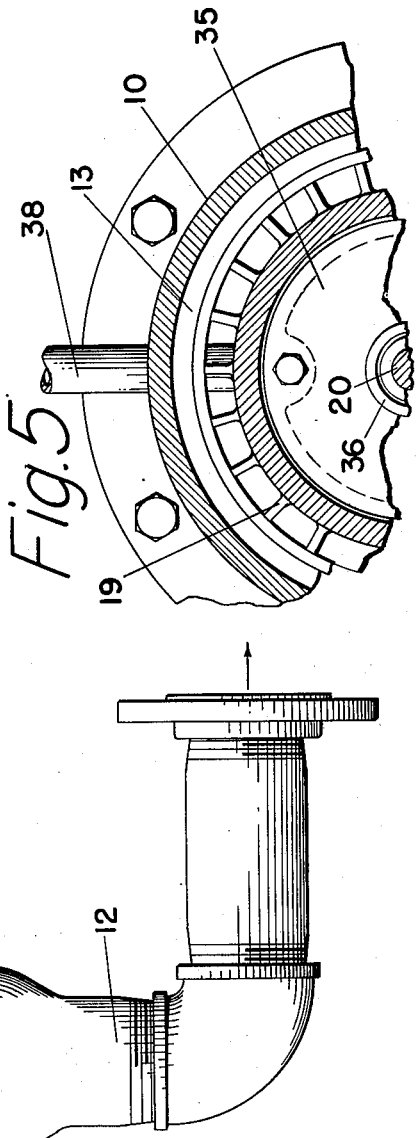
INVENTOR.
Einar T. Young
BY
Busser and Harding
Attorneys Oct. 28, 1952 — E. T. YOUNG — 2,615,335

PIPE LINE METERING DEVICE WITH BEARING PROTECTION MECHANISM

Filed July 15, 1948 — 4 Sheets-Sheet 3

INVENTOR.
Einar T. Young
BY
Busser and Harding
Attorneys

Oct. 28, 1952     E. T. YOUNG     2,615,335
PIPE LINE METERING DEVICE WITH BEARING PROTECTION MECHANISM
Filed July 15, 1948     4 Sheets-Sheet 4

INVENTOR.
Einar T. Young
BY
Busser and Harding
Attorneys

Patented Oct. 28, 1952

2,615,335

UNITED STATES PATENT OFFICE 2,615,335

PIPE LINE METERING DEVICE WITH BEARING PROTECTION MECHANISM

Einar T. Young, Ridley Park, Pa., assignor to Sun Oil Company, Philadelphia, Pa., a corporation of New Jersey Application July 15, 1948, Serial No. 38,911

1 Claim. (Cl. 73—231)

This invention relates generally to flowmeters and more particularly to liquid flow measuring devices of the rotary impeller type which motivate registering meters on pipe lines or other liquid conductors.

It is the principal object of this invention to disclose a flowmeter adapted to measure the flow of dense liquids, such as crude oil, which carries quantities of foreign matter very damaging to ordinary measuring devices.

Another object is to disclose a rotary impeller type of flowmeter in which the measured fluid is prevented from flooding the mechanism by compressed inert gas being supplied as needed to a reservoir in the meter housing.

Yet another object is to disclose a flowmeter with the liquid level in the housing retained by compressed inert gas where the quantity of gas supplied from an outside source is controlled by the height of the liquid in the meter housing.

A further object is to disclose a device of high accuracy and long wearing qualities adapted to measure the flow of dense liquids by reducing the frictional resistance in the operation of the moving parts.

Figure 2:
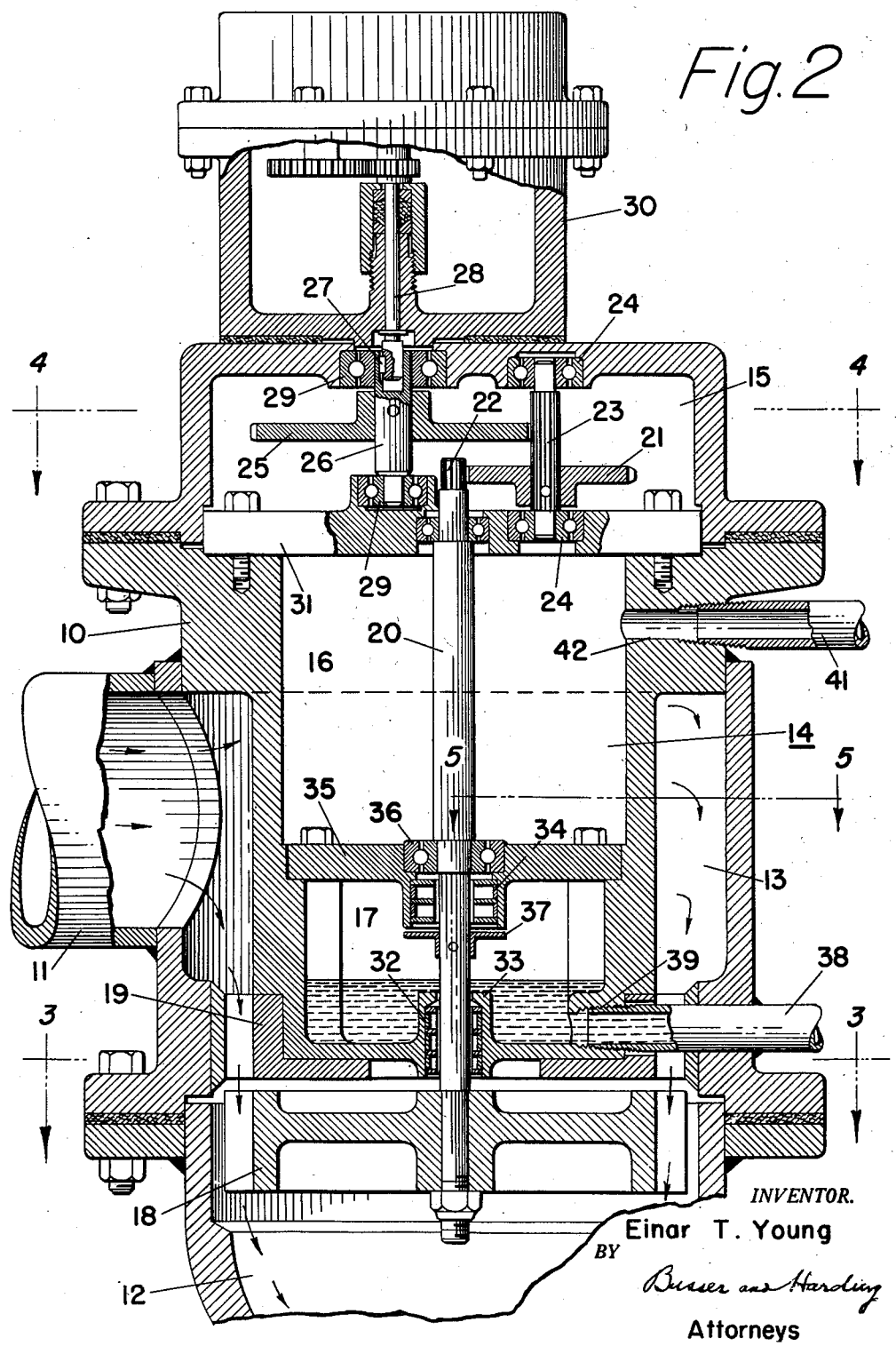
Figure 3:
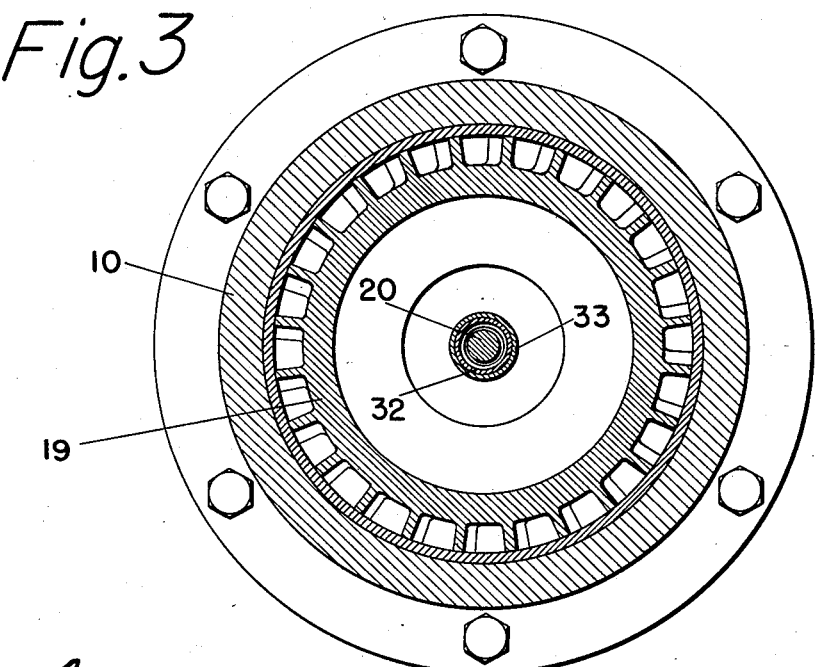
Figure 4:
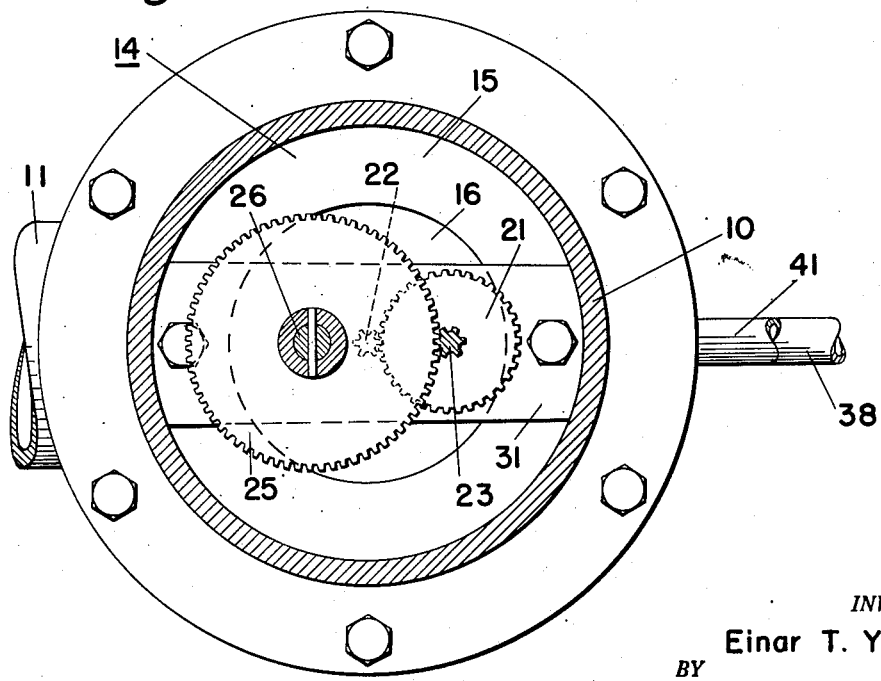
Figure 6:
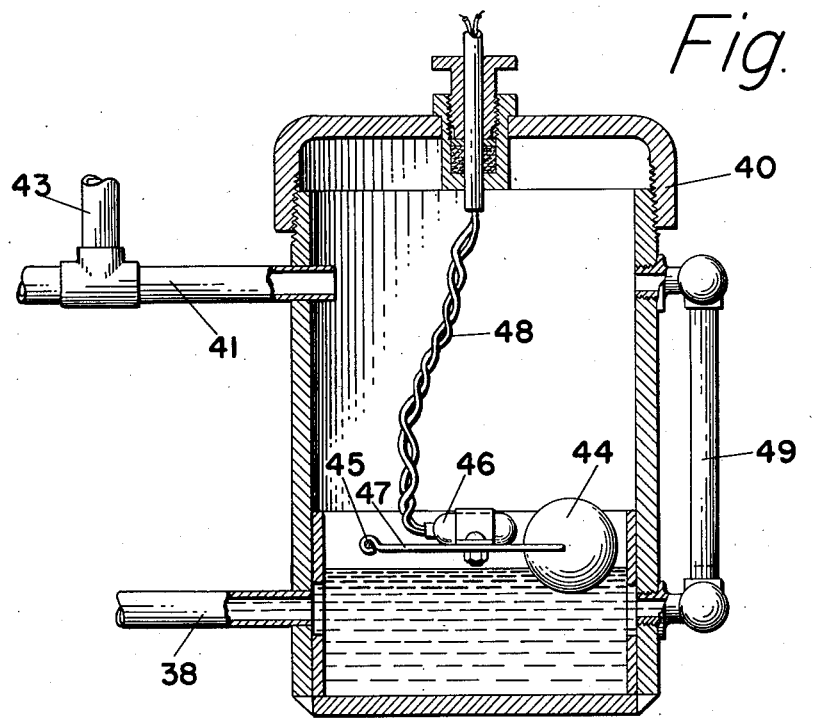
Figure 7:
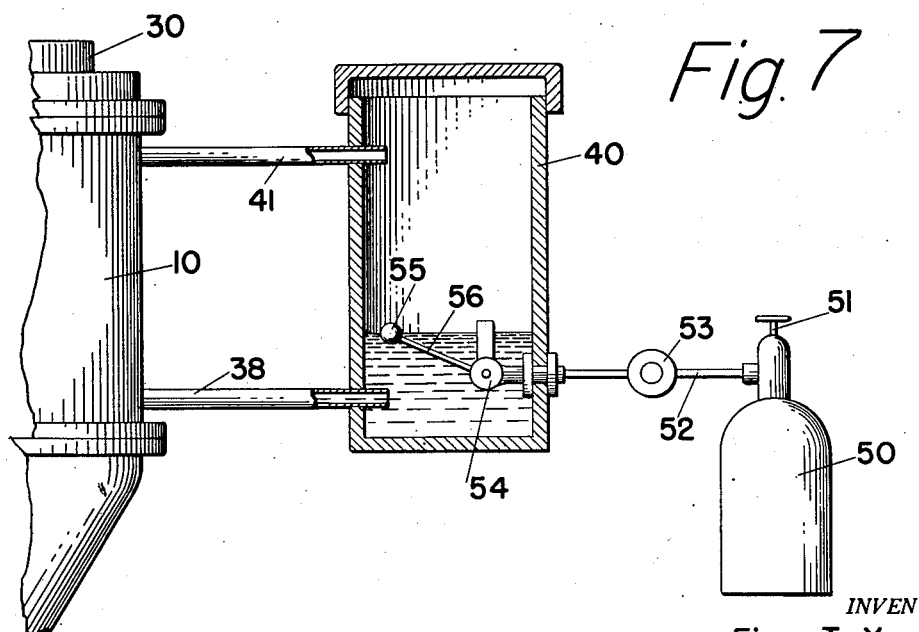

Flowmeters for measuring crude oil have had to meet unusual demands in structure. The foreign matter present in the liquid is often abrasive in character and in a short time destroys the bearings or so weakens them that the accuracy of the meter is impaired. Further, if the heavy, viscous liquid reaches the main bearings of the registering mechanism usually attached to flowmeters of this type, it will cause them to stick together and prevent a correct registering of the flow. The present disclosure shows the seals nearest the liquid flow of the labyrinth type to eliminate the abrasive action yet present an obstruction which, together with the compressed inert gas, will keep the bearings free of the crude oil and in good operating condition. This and other advantages will be evident from the disclosed embodiment of the invention illustrated in the following drawings in which:

Figure 1 is a diagrammatic view of the assembly of a preferred embodiment of the invention, Figure 2 is an elevation of the flowmeter in cross-section, Figure 3 is a cross-section on line 3—3 of Figure 2, Figure 4 is a cross-section on line 4—4 of Figure 2, Figure 5 is a cross-section on line 5—5 of Figure 2, Figure 6 is a cross-section of a float switch to control the supply of inert gas, Figure 7 is an alternative valve and inert gas supply.

The figures of the drawing illustrate a preferred embodiment of the flowmeter for actuating a registering mechanism. The details of that part of the apparatus which forms the invention are completely illustrated while the generally available elements such as the compressor and motor are shown diagrammatically. Figure 1 shows the assembly of the various elements which comprise the preferred embodiment. The numerical designations of the components are in accord with the subsequent figures to eliminate confusion. The flowmeter housing 10 is vertically positioned in the conduit through which the liquid to be measured flows, connected in the flow by inlet 11 and outlet 12. A volume register 30 is illustrated as immediately adjacent the housing 10, but need not be as later explained. A float switch chamber 40 is connected to the flowmeter 10 by conduits 38 and 41 which transmit liquid and inert gas respectively in balancing the mechanism during operation. Motor 60 intermittently actuates compressor 61 to which it is shaft connected, when electrical power is transmitted to the motor by the operation of the float switch in housing 40. An inert gas source is connected to compressor 61 where sufficient pressure is formed to force the gas into flowmeter housing 10 and float switch housing 40 where the level of the measured liquid is maintained at operating level in contact with the inert gas.

Figures 2, 3, 4 and 5 disclose the mechanism of the flowmeter which is positioned to cooperate with the housing 10. The liquid to be measured is conducted to an outer chamber 13, of the housing 10, which surrounds an inner chamber generally designated as 14 and then passes out through outlet 12 to continue through the pipe line. This inner chamber is divided into a gas reservoir 16 and a liquid-gas contact compartment 17. A compartment 15 in free exchange relation with gas reservoir 16 forms the closure for the top of the inner chamber. A vaned rotor of the impeller type designated as number 18 is concentrically aligned with the housing 10 below a stator ring 19 which directs the liquid to be measured in its downward flow through the outer chamber 13 from inlet 11 to outlet 12. A shaft 20 is rigidly attached to the rotor 18 and passes upward, concentric with the housing 10, through the liquid-gas contact compartment 17 and the gas reservoir 16 to engage a reduction gear train in the upper compartment 15.

The reduction gear train, although it may contain other arrangements of gears than those illustrated, is shown here as a gear wheel 21 meshing with a spline 22 on the upper end of shaft 20 and being rigidly attached to a splined shaft 23 which is supported between bearings 24. The rotary motion of splined shaft 23 is transferred to gear wheel 25 which transmits the rotary motion of splined shaft 23 to shaft 26, slotted at 27 to receive the operating shaft 28 of a registering device. Bearings 29 support shaft 26 in alignment for the ready reception of the connecting link with the registering device illustrated here as a series of meter dials in a housing 30. The support 31 for the reduction gear train, as described, may take the form of a plate or bracket which is bridged across housing 10 to maintain the alignment of the shaft 20 and the reduction gear train as above described. It will be noted that a ready exchange of inert gas between the upper compartment 15, which encloses the reduction gear train, and the gas reservoir 16 is permitted so that a solid barrier in place of the supporting plate or bracket 31 is not required.

The lower part of shaft 20 above and adjacent to the stator ring 19 passes through a lower labyrinth baffle 32 which is enclosed in a retainer 33 and entirely surrounds shaft 20. Shaft 20 is supported at its lower end by bearing 36 which is mounted in plate 35, the partition between the gas reservoir compartment 16 and the liquid gas contact compartment 17. An upper labyrinth baffle 34 is also mounted on plate 35. The support 35 is constructed as a solid plate to prevent the splashing or surging of the liquid into compartment 16 and flooding bearing 36. This detail is shown in Figure 5. An obturating disk 37 is firmly fastened to shaft 20 immediately below the upper labyrinth baffle 34. A pipe or conduit 38 is let into housing 10 through a threaded aperture 39 and transmits the liquid being measured which rises in the liquid-gas contact chamber 17. The conduit 38 connects the liquid-gas contact chamber 17 to a liquid float switch generally indicated as 46 in Figures 1 and 6. The upper part of the housing for the liquid float switch mechanism is connected by conduit 41 to the gas reservoir 16 through an aperture 42 in housing 10. A conduit 43 connects conduit 41 to a source of compressed inert gas shown and described in discussing Figure 1.

The liquid float switch mechanism generally indicated in Figure 6 comprises a housing 40 which is gas tight and a simple electrical float switch of the mercury type. The float 44 is hinged at a point 45 and has an electrical switch 46 mounted on the float supporting arm 47. An electrical conductor 48 connects the switch 46 with a source of power and a motor for operation of the inert gas compressor, neither of which are shown in this figure but which are illustrated in Figure 1 and hereinbefore discussed. A level gauge glass 49 is shown attached to the float chamber housing 40 for the visual detection of the liquid elevation therein.

Figure 7 shows an alternative device for the supply of inert gas to the inner chamber 14 of the housing 10 and comprises a source of inert gas as a tank 50 in which the inert gas is maintained at pressure. An operating valve 51 permits the compressed gas to enter conduit 52, pass through an automatic pressure reducer 53 and enter the float chamber 40 through a mechanically controlled float valve 54. Float 55 is connected by arm 56 to open and close valve 54 as the position of float 55 is changed by the supporting liquid.

Figure 1, as described above, diagrammatically illustrates the relative positions of the components in the preferred embodiment of the invention. This figure, together with Figures 2, 3, 4, 5 and 6 will be used as references in discussing the operation of this flowmeter where the supply of compressed inert gas is furnished through a motor-operated compressor actuated by the float switch as contrasted with the supply being furnished from a compressed gas tank as described above in relation to Figure 7.

Referring to Figures 1, 2, 3, 4, 5 and 6, the liquid to be measured enters the outer chamber 13 of housing 10 from inlet 11 and passes downward toward outlet 12 activating rotor 18 as directed by stator ring 19. The rotary motion is transferred by shaft 20 to the reduction gear train in upper compartment 15 and is reduced by gear wheels 21 and 25 in cooperation with the splined shaft 23 to activate connecting shaft 26 which, in turn, operates the registering device. It will be understood that this registering device may take any form which is capable of receiving rotary motion and translating that motion into a measure of volume. A typical commercial register of the dial type is illustrated here but need not be the only device which can be used with this flowmeter.

As the flowmeter operates, the pressure on the liquid flowing through the pipe line as described above will cause the liquid to creep up shaft 20 and, if not prevented, it will flood the entire mechanism. The specific type of liquid for which this flowmeter is designed includes a heavy viscous material in which foreign bodies such as sand and other abrasives are normally found. If such liquid were to flood the mechanism as suggested it would be necessary to make expensive repairs and possibly replace the flowmeter. To control this, a labyrinth baffle 32 (Figures 2 and 3) is introduced around, but not in contact with, shaft 20 at a point just above the stator ring 19. This acts as a baffle to retard the upward passage of the liquid being measured and permits sufficient time for the operation of the gas supply mechanism to effectively prevent the liquid from reaching the bearings. The pressure pulsations in the liquid in the pipe line are reduced by this baffle and the gas supply is maintained in smooth operation.

As the liquid level rises in the liquid-gas contact chamber 17 between shaft 20 and the elements of baffle 32, the elevation of the liquid is transmitted to float chamber 40 through aperture 39 and conduit 38 (Figures 1, 2 and 6). The pressure of the inert compressed gas which is in the gas reservoir 16 is transferred and balanced in the upper part of float chamber 40 thereby causing the same conditions to exist in float chamber 40 between the liquid and gas as exists in the inner chamber 14 of the flowmeter housing 10.

As the liquid rises to a predetermined level in the flow-meter, the float switch is forced upward by float 44 and the switch 46 is caused to make contact. The electrical current as supplied from the power source activates compressor 61, shaft-connected to motor 60, which receives inert gas from a source (not shown) and transmits it under predetermined pressure through conduit 43 and conduit 41 to the gas reservoir compartment 16 of the housing 10 and the float chamber 40. The inert gas under pressure, admitted to the gas reservoir compartment 16, passes downward between the bearing 36 and baffle 34 where they embrace shaft 20 to act upon the liquid level within the liquid-gas contact chamber, forcing the liquid downward and thereby reducing the liquid level in float chamber 40 (Figure 6) permitting the float switch to break contact and cut off the power supply to the motor-compressor device. This operation repeats automatically as often as is required thereby insuring the safety and proper operating conditions of the mechanism of the flowmeter. The frequency with which the operation is repeated due to transmitting pressure surges through the liquid is reduced to a minimum by the baffle 32 controlling the admission of the liquid into the lower part of compartment 17.

The upper baffle labyrinth 34 (Figure 9) located below support 35 is a further safeguard to the flowmeter mechanism and retards the upward movement of the measured liquid along shaft 20. As noted above, there is a clearance between the subdivisions of the baffle and shaft 20, eliminating any additional friction and permitting the passage of the compressed gas. Its function as a liquid baffle is the same as described for lower baffle labyrinth 32. To prevent the measured liquid from entering the upper baffle labyrinth easily, the obturating disk 37 is placed immediately below the upper labyrinth 34 and fixed firmly to shaft 20. As the shaft rotates, any liquid which has crept up the shaft will meet the obturating disk 37 and be flung outward away from the upper labyrinth 34.

From the above description, the substitution of the tank of compressed inert gas with the mechanically operated float valve, shown in Figure 7, in place of the motor compressor unit and the electrically operating float valve will be readily understood. The mechanism to supply the inert gas under a predetermined pressure is activated by the height of the liquid in the liquid-gas contact chamber 17 in the same manner as discussed above. The gas under pressure is admitted by the automatic float valve 54 and first passes into the upper part of chamber 40 rather than into conduit 41 as described in the discussion of Figure 6 above. From chamber 40 in Figure 7 it is transferred to gas reservoir compartment 16 to function as already described.

In the metering of crude oil, nitrogen is a very acceptable inert gas as it is relatively cheap and readily available. When this device is used for measuring the flow of other liquids, to which it is well adapted, those liquids might require the substitution of a comparatively very inert gas such as helium. For metering water, compressed air would be satisfactory. In order to determine the inert gas required in any specific circumstance it is necessary to study the case and determine if the solution of a small amount of gas in the measured liquid would have any serious effects.

The above disclosure details a flowmeter for actuating a registering device wherein the mechanism is protected by an intervening inert gas and the conventional seals ordinarily used for this purpose are eliminated. The flow of protecting gas is controlled by the height the liquid rises within the flowmeter mechanism. The labyrinth baffles, together with the protecting gas, eliminate the objection of high friction and corrosion damage of the bearings attributable to existing flowmeters. By simple mechanical adaptation, this invention may be altered or changed to include either the mechanical or electrical float control within the liquid-gas contact compartment thereby eliminating a separate float chamber. Such alteration has been considered by the inventor as a possible working device but is not illustrated here because it is believed that the preferred embodiment which is shown and discussed is more satisfactory for industrial use permitting a greater flexibility under a wide range of operating conditions and enabling immediate and proper repairs to be undertaken with a minimum of disassembly.

I claim:

A flowmeter comprising a housing partitioned to provide an upper gas compartment containing transmission gearing for an associated flow indicator, an intermediate liquid-gas contact compartment and a lower liquid compartment containing a rotor operable by the flow of liquid therethrough, means for flowing liquid to and through said lower compartment, a rotatable shaft connected to said rotor and passing upwardly through said intermediate and upper compartments for operating connection with said transmission gearing, a shaft seal in the partition between said intermediate and lower compartments permitting restricted flow of liquid therebetween, means for admitting gas from an external pressure source to said upper compartment, and control means responsive to the liquid level in said intermediate compartment for regulating the flow of gas into said upper compartment.

EINAR T. YOUNG.

REFERENCES CITED

The following references are of record in the file of this patent:

UNITED STATES PATENTS

| Number | Name | Date |
|---|---|---|
| 979,518 | Larrabee | Dec. 27, 1910 |
| 1,427,974 | Sessions | Sept. 5, 1922 |
| 1,483,225 | Hammett | Feb. 12, 1924 |
| 1,670,308 | Marden | May 22, 1928 |
| 2,176,294 | Cox | Oct. 17, 1939 |
| 2,291,248 | Myers | July 28, 1942 |

FOREIGN PATENTS

| Number | Country | Date |
|---|---|---|
| 15,802 | Great Britain | 1905 |